UNITED STATES PATENT OFFICE.

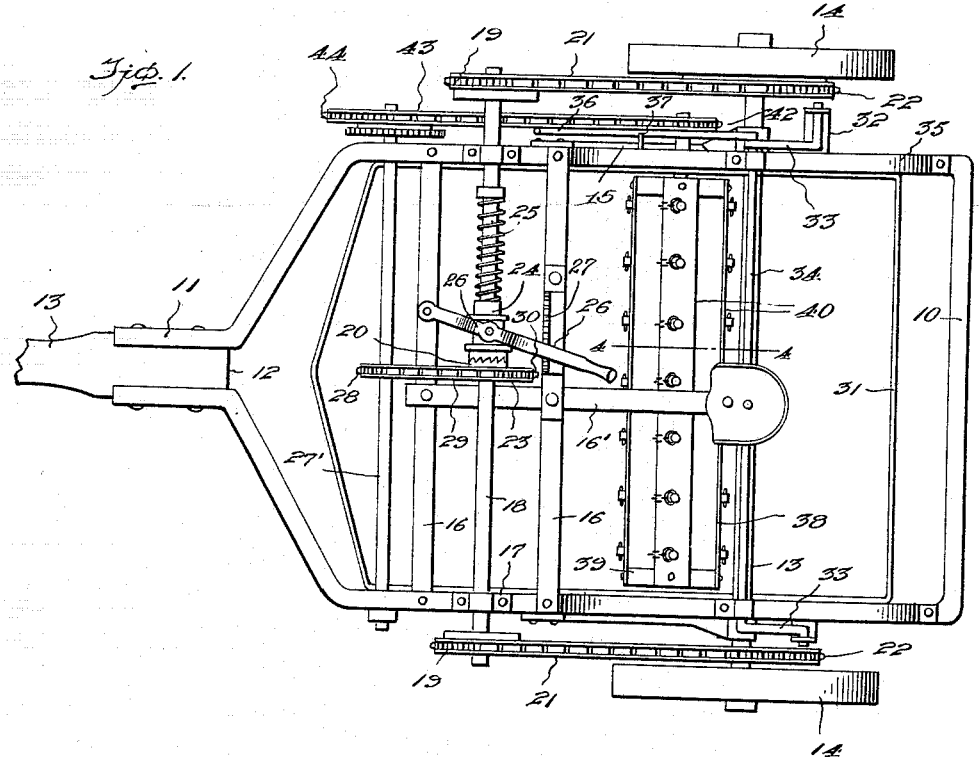
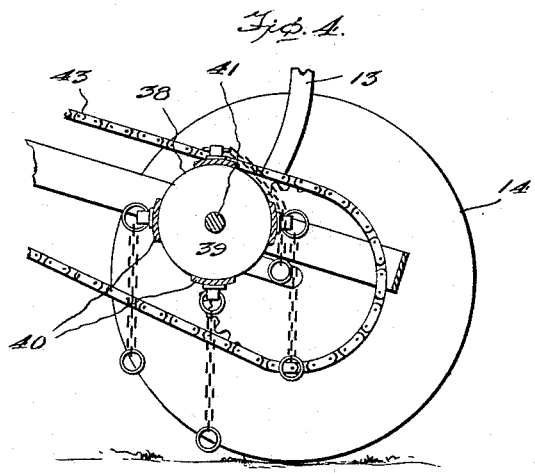

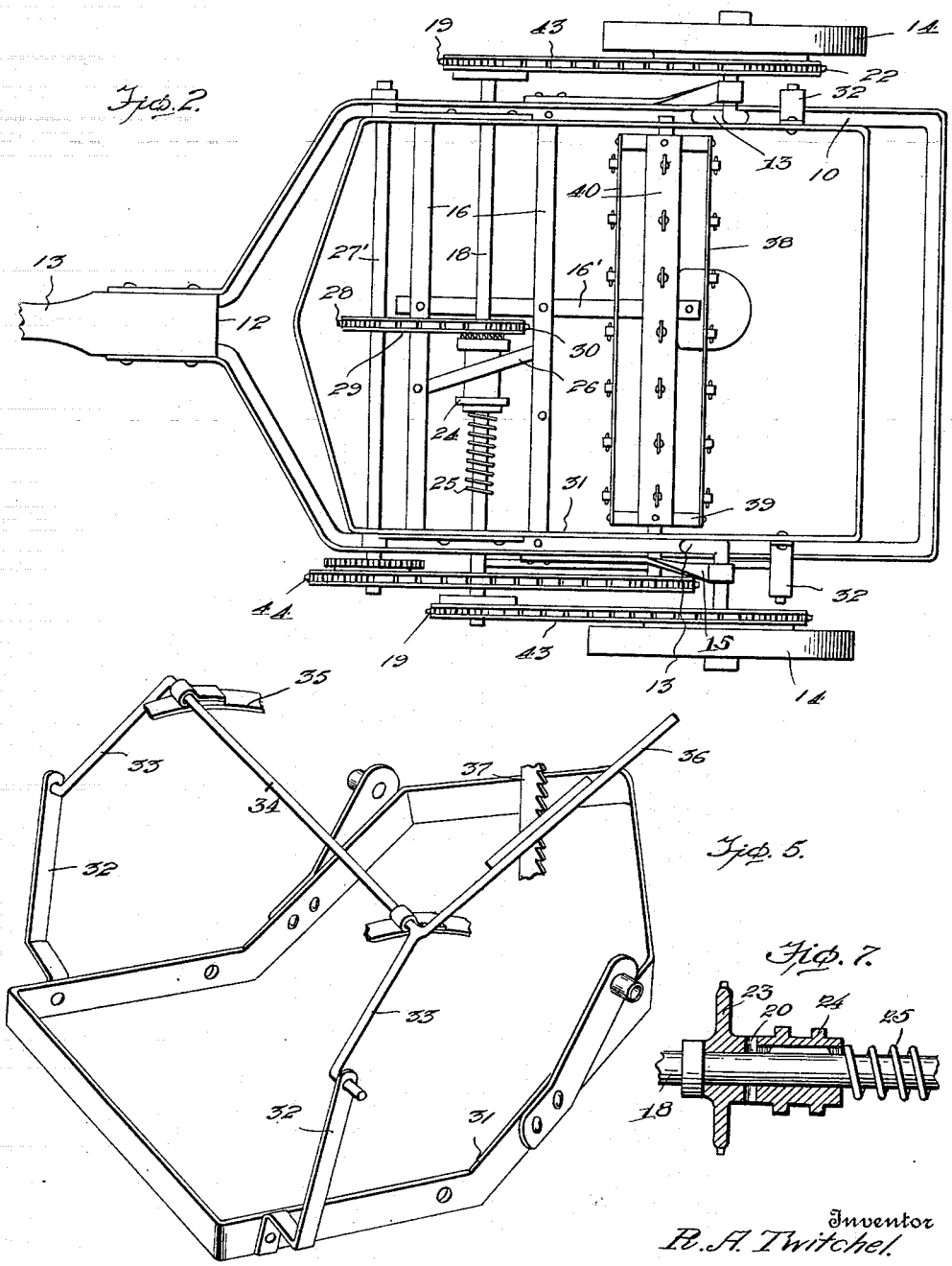

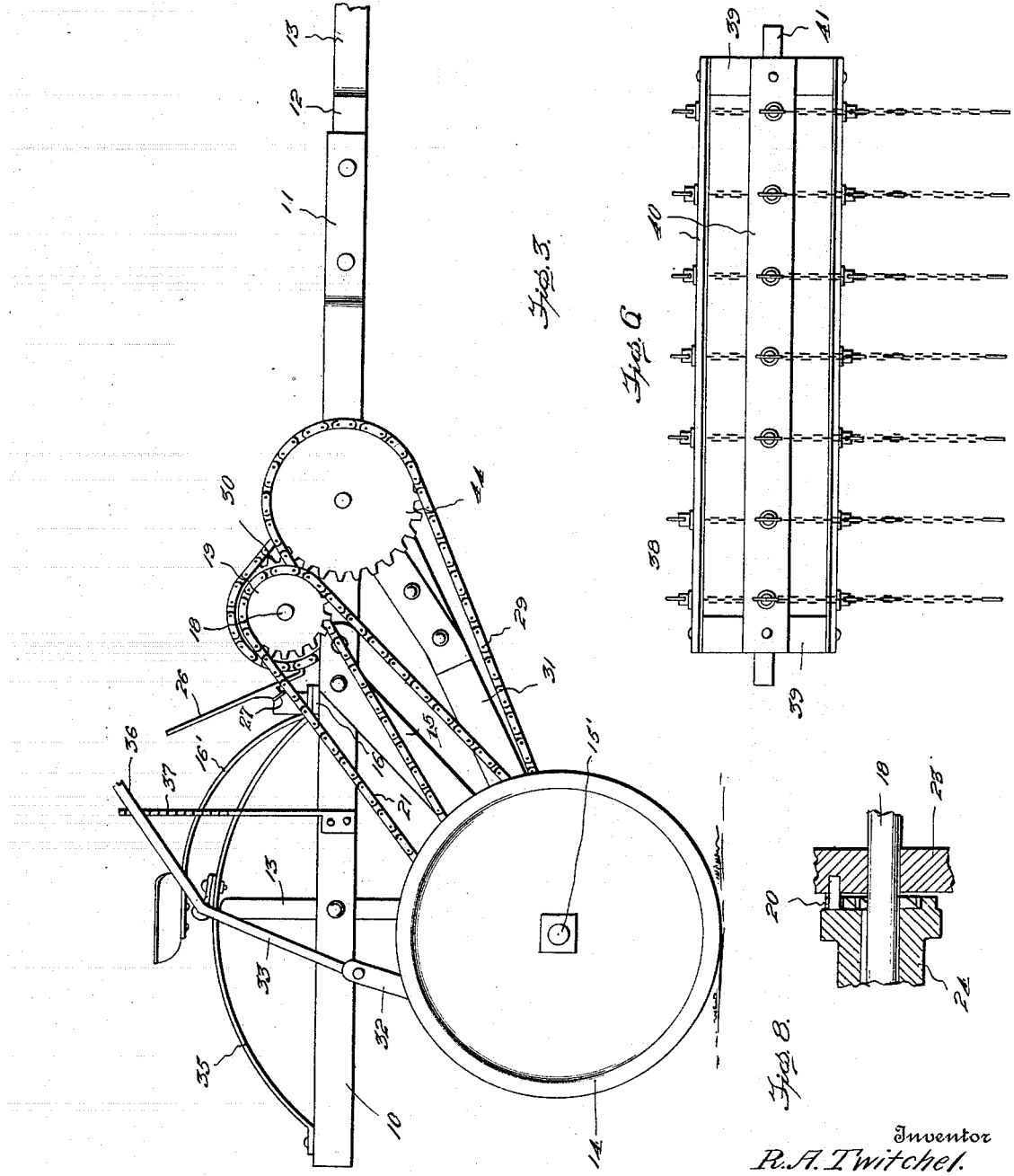

RALPH A. TWITCHEL, OF MONTREAL, MISSOURI.

WEED-CUTTER.

1,263,965.

Specification of Letters Patent. Patented Apr. 23, 1918.

Application filed June 13, 1916. Serial No. 103,395.

*To all whom it may concern:*

Be it known that I, RALPH A. TWITCHEL, a citizen of the United States, residing at Montreal, in the county of Camden and State of Missouri, have invented certain useful Improvements in Weed-Cutters, of which the following is a specification, reference being had therein to the accompanying drawing.

This invention relates to improvements in weed cutters or destroyers, one object of the invention being the provision of a wheel actuated mechanism and means by which the cutting mechanism may be thrown into and out of operation at will, there being provided adjustable means for regulating the position of the cutter relatively to the surface traversed, so that a greater or less cut of the weeds may be obtained.

A further object of this invention is the provision of a device of this character in which the wheels act as a means for operating the countershaft which in turn drives a rotary cutter.

With the foregoing and other objects in view, and which will appear as the description proceeds, this invention resides in the novel arrangement and combination of parts herein set forth.

In the accompanying drawings:—

Figure 1 is a top plan view of the complete machine.

Fig. 2 is a bottom plan view thereof.

Fig. 3 is a side elevation taken from the right hand side thereof.

Fig. 4 is a longitudinal section taken on line 4—4 of Fig. 1.

Fig. 5 is a skeleton perspective view of the rotary cutter carrying frame and the elevating and lowering means therefor.

Fig. 6 is a plan view of the cylinder with the flexible beaters thereon, and

Figs. 7 and 8 are fragmentary sectional elevations of the clutch.

Referring to the drawings, the numeral 10 designates the two side members of the frame which are preferably angle iron and have their forward ends 11 attached to embrace the rear end 12 of the tongue 13.

Carried by the frame is the inverted U-shaped axle 13 supporting the tractor wheels 14, the braces 15 being secured to the members 10 and to the stub ends 15' of the axle.

The cross plates or strips 16 are attached to the members 10 transversely of the frame, and to them is attached the seat supporting member 16', while attached to the members 10 between such strips are the journals 17 for the countershaft 18. The countershaft 18 has fixed thereto the sprockets 19 over which are trained the sprocket chains 21, the same being also trained over the sprockets 22 carried by the tractor wheels 14 so that motion from the latter will be imparted to said countershaft 18 which supports a clutch mechanism hereinafter fully described.

Mounted upon the countershaft 18 is the loose clutch member 23 which is adapted to be connected to the countershaft for rotation through the splined clutch member 24, both clutch members being formed with the usual ratchet teeth 20 which are normally held in engagement by means of the spring 25 so that the loose clutch member 23 will be positively driven in one direction. The throw lever 26 is connected with the splined clutch member 24 and is readily accessible to the operator so that the same can be thrown to disengage the clutch members from each other and is held in such position against the tension of the spring 25 when engaged with the rack keeper 27 on the cross strip 16 of the frame.

Journaled in the members 10 forwardly of the countershaft is the driven shaft 27' which is provided with the sprocket 28 which through the sprocket chain 29 receives motion from the sprocket 30 of the freely rotatable clutch member.

Connected to the frame with the driven shaft as its axis, is the yoke 31 which extends rearwardly between the tractor wheels and within the supporting axle thereof and has attached to the free ends the upstanding arms 32 which in turn are connected to the two cranks 33 carried by the rock shaft 34 which in turn is journaled in the two curved supporting members 35 attached to the members 10, the crank 36 being disposed in ready access to the operator for raising and lowering the free ends of such yoke, the locking device 37 being provided to hold the same in the various desired adjustments.

Carried intermediate of the free ends of the yoke is a rotary cylinder 38 which consists of the two drums 39 having the longitudinally disposed slots 40 having the loosely hung weed cutting and beating elements 40'. Connected to one free end of the rotary weed cutter shaft 41 is a small sprocket 42 which is connected by means of the sprocket chain 43 to the large sprocket 44 mounted upon the driven shaft.

By this means it will be seen that power is transmitted from the tractor wheels through the countershaft to the driven shaft to in turn operate the rotary cutter which may be adjusted as heretofore described, to and from the ground for cutting weeds of various heights.

What I claim as new is:—

1. In a device of the class described, in combination an open frame including two parallel side bars, a yoke frame also including a pair of parallel arms formed angular so that one end of the yoke inclines relatively to the other end, a driver's seat mounted centrally at the rear end of the first frame, a pair of tractor wheels secured below said first frame in line with said seat, the side arms of said yoke being fulcrumed at their forward ends against the inner faces of the side bars of the first frame so that the forward end of said yoke will incline downwardly, a weeder drum mounted upon the side arms of said yoke at the rear end of said frame and directly below said seat, means for adjustably suspending said yoke at its outer end so as to hold said weeder drum in a raised or lowered position and means for rotating said weeder drum.

2. In a device of the class described, in combination, a frame having parallel side bars, a closed yoke having angular side arms pivotally suspended between said side bars, an inverted U-shaped axle secured to said frame and terminating in stub portions, tractor wheels mounted upon said stub portions, a pair of segmental supports secured upon the outer edges of the rear end of said frame, a weeder drum rotatably mounted between the arms of said yoke, upstanding arms secured to the arm of said yoke at its outer end and stepped laterally therefrom so as to be positioned outside of said first frame, bearings on top of said segmental supports, a crank shaft in said bearings having cranks secured to the upper ends of said upstanding arms so as to raise and lower the same, an operating handle on said crank shaft, means for locking said handle in adjusted position, driving mechanism outside said frame controlled by said tractor wheels, and driven mechanism on said frame, between the arms of said yoke and adapted to actuate said weeder drum.

In testimony whereof I affix my signature.

RALPH A. TWITCHEL.

Copies of this patent may be obtained for five cents each, by addressing the "Commissioner of Patents, Washington, D. C."